July 14, 1959 D. K. REYNOLDS 2,894,796

MAGNETIC RECORDING SYSTEM

Filed Nov. 9, 1953

INVENTOR
DONALD K. REYNOLDS

BY Lyon & Lyon
ATTORNEYS

United States Patent Office 2,894,796

Patented July 14, 1959

2,894,796

MAGNETIC RECORDING SYSTEM

Donald K. Reynolds, Palo Alto, Calif., assignor, by mesne assignments, to General Electric Company, New York, N.Y., a corporation of New York

Application November 9, 1953, Serial No. 390,908

7 Claims. (Cl. 346—74)

Figures 1A, 1B, 1C, 2:
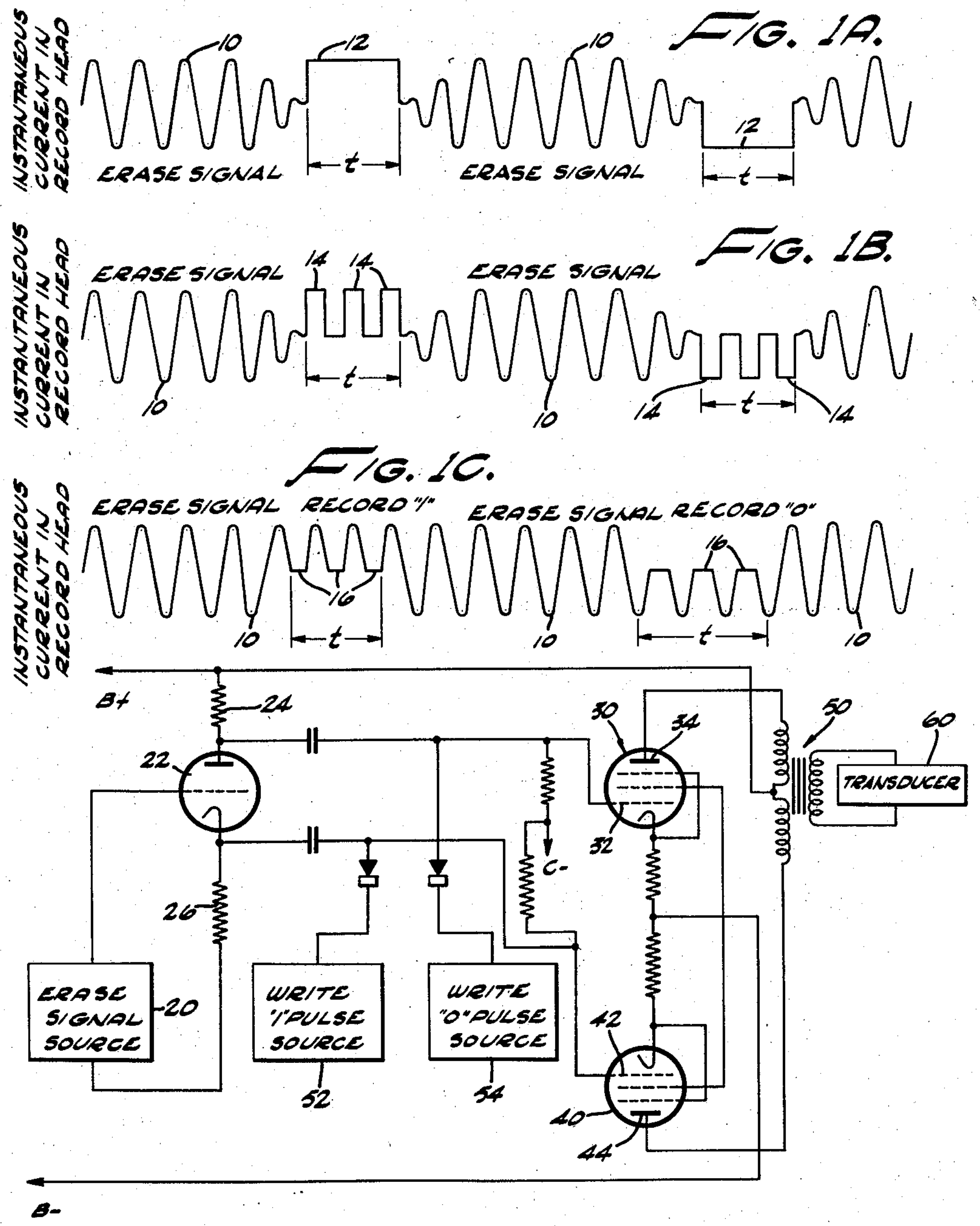

This invention relates to a system and apparatus for the magnetic recording of signals, and, more particularly, to an improved system for magnetically recording data.

In recording data on magnetic tape, which is to replace data which has been previously recorded on said tape, it is customary to first erase the previously recorded signals and then to write the new signals. Attempts to eliminate erasing and to write new binary coded data on top of old have required a very precise positioning of the new data on top of the old, in order to avoid residual traces of the old data interfering with the read-out of the newly recorded signals. This has been very difficult to accomplish because of mechanical instabilities in both the recording medium and the tape transport, and, accordingly, with magnetic tapes the favored method of writing has remained to erase the old data and then to record the new. With magnetic drums, because of the mechanical stability of the medium, it is possible to write new data precisely on top of the old by using some method of permanently marking the location of each of the signals being recorded and then using these markings to generate signals for the purpose of gating the writing or reading amplifiers.

An object of this invention is to provide a system for writing binary coded data on a magnetic medium which avoids the requirement for erasing old data and writing new data in two successive operations.

Another object of this invention is to permit the recording of new data over old data without requiring precise identification of the locations of the data wherein write-in is to occur.

Still a further object of the present invention is to provide a system and apparatus for magnetically recording data which is more inexpensive than heretofore.

Still a further object of the present invention is to provide a new and useful system and method of recording new data over old data on a magnetic medium.

These and further objects of the present invention are achieved by using a magnetic transducer to which is applied alternating current erasing signals. When it is desired to write, a desired portion of this alternating current signal is prevented from being applied to the magnetic transducer. Thus the remaining portion is applied to the transducer and is recorded for a desired interval. The recording is thus performed in binary fashion and may consist of pulses of either polarity or of only one polarity, to represent a One or a Zero. On either side of the position of signal recording there is an area of erasure or no signal, in view of the erasing action. Thus, on reading, the signal and the no-signal regions may be readily identified.

The invention, itself, both as to its organization and manner of operation, together with further objects and advantages thereof, may be best understood by reference to the following description taken in connection with the accompanying drawings in which:

Figures 1*a*, 1*b* and 1*c* are a series of wave shapes of current which may be applied to a magnetic transducer which are shown in order to assist in an explanation of the principles of operation of my invention; and Figure 2 is a schematic and circuit diagram of an embodiment of my invention.

If a single transducing head is employed in a magnetic tape recording system and an A.C. current is passed through the head with sufficiently high frequency and high amplitude to erase whatever signals were previously recorded, the erased signal which is applied to the recording head would have the wave shape 10, as shown in Figure 1*a*, during the intervals of its application. In order to write new data, the erasing signal 10 may be interrupted and a suitable recording pulse 12 may be applied to the transducer in its place having a positive polarity for representing the binary One, for example, and a negative polarity for representing the binary Zero. A composite picture of the wave shape of the current which is applied to the magnetic transducer would then be represented by the complete picture shown in Figure 1*a*.

A reading by conventional and well known methods of the magnetic record resulting from applying such a current to the magnetic transducer would simply provide two pulses in the pickup transducer used for reproduction, one pulse of positive polarity and the other pulse of negative polarity. It is to be understood that the pulses applied should be of sufficient strength to override any signal which was previously recorded on the magnetic medium. In order to facilitate transformer coupling between a recording amplifier and the recording head, the writing wave form may consist of one or more short pulses 14, as shown in Figure 1*b*. The time "*t*" during which the erase signal is turned off to permit the recording must be sufficiently long to permit the portion of the tape with the newly recorded signal to leave the recording head gap before the erase signal is again turned on.

An alternative and simpler scheme to the one shown in Figure 1*b* is obtained simply by rectifying the erase signal, to obtain the wave shapes 16 shown in Figure 1*c*, in order to record a One or a Zero. The corresponding current wave form in the recording head is shown in Figure 1*c*.

It will be seen that the signal for a One is a series of positively recorded pulses 16 and the signal for a Zero is a series of negative recorded pulses 16. Each signal is spaced from the other by a small erase signal portion.

Reference is now made to Figure 2, wherein an embodiment of the invention is shown. A source 20 of alternating current erase signals represented by a rectangle has its output applied to an amplifier tube 22 which operates to convert the alternating current erasing signals to push-pull signals, in a manner well known to the art. The tube has an anode load resistor 24 and a cathode load resistor 26 which have substantially the same resistance value. The output from the anode and cathode are respectively applied to the control grids 32, 42 of two tubes 30, 40 which are interconnected as a push-pull amplifier. The push-pull amplifier is biased from a bias source through its control grids 32, 42 to be nonconducting except in the presence of the push-pull erase signal. Accordingly, the erase signal is applied through the output transformer 50, which is coupled to the anodes 34, 44 of the tubes in the push-pull amplifier.

In order to write a One, a negative pulse may be applied from a write-1 pulse source 52 to the control grid 42. This has the effect of cutting off one of the amplifiers 40. The other amplifier 30 will still provide an output, by virue of the erase signal being applied to its grid, having one polarity. The current to the transducer head 60, accordingly, will be a half wave 16 of the type shown in Figure 1*c*. The duration of the negative pulse should be sufficient to allow as many half-wave cycles to be recorded as are required for correctly identifying the signal as a One when the operation of reading occurs. This, of course, may depend upon the frequency of the erase signal and a number of other factors such as the mechanical construction of the reading head and the speed of the tape. These are factors all well known to the art and can be readily ascertained for each particular case.

At the end of the write-1 pulse, the complete erase signal is again applied to the transducer 60. In order to record a Zero, a write-0 pulse source 54 provides a negative pulse to the grid 32 to cut off the other tube 30 in the push-pull amplifier. This permits the recording of half waves of a polarity opposite to those recorded in the case of the application of the write-1 pulse source.

There is thus made available by this invention a system of recording wherein a single transducer head performs the operation of writing on a magnetic medium such as magnetic tape without the requirement of previously erasing the previously recorded data. If it is desired, a single signal may be applied to cut off only one of the amplifiers to designate the recording of a binary One digit, and the presence of the erase signal or no signal on the tape may be made to identify the binary Zero digit. This system may be used where it is desired to pack data on the tape to the maximum degree.

It is to be understood that the circuit diagram shown in Figure 2 is merely exemplary of the manner in which the data recording method of the present invention may be accomplished. Other apparatus may be used to achieve this result, for example, the output transformer 50 may be replaced by a transducer head with a center tapped winding, and direct connections may be made accordingly from the amplifier tube anodes. The cut-off signals to the amplifier tubes may be applied to other grids of the tubes than the control grid, or, if desired, such cut-off signal may be applied to other portions of the circuit which precede the push-pull amplifier in well known manner to effectuate this result. It is important, however, that the amplifier tubes be biased to cut off, so that no plate current flows when the erase voltage is removed from the input. This permits the tube which is not biased off for the purpose of writing to still receive unidirectional pulses of current to the output, thus effectuating the writing operation.

There has accordingly been described and shown herein a new, useful, and inexpensive magnetic recording system which obviates the necessity for two operations in recording new data over old.

I claim:

1. Apparatus for recording signals with a magnetic transducer on a moving magnetic medium comprising means to generate alternating current erasing signals, means to apply said alternating current erasing signals to said magnetic transducer, and means to prevent a portion of said alternating current signals from being applied to said transducer by said means to apply for a desired interval while said means to apply applies to the remainder of said alternating current signals to said transducer to thereby record a signal.

2. Apparatus as recited in claim 1 wherein said means to prevent a portion of said alternating current signals from being applied to said transducer includes means to prevent that portion of said alternating current signal having a given polarity.

3. Apparatus for recording signals with a magnetic transducer on a moving magnetic medium comprising means to generate alternating current erasing signals, means to apply said alternating current erasing signals to said magnetic transducer, and means to direct said means to apply said alternating current signals to said transducer to apply only a desired portion of said alternating current erasing signal to said magnetic transducer for a desired interval to thereby record a signal.

4. Apparatus for recording signals with a magnetic transducer on a moving magnetic medium comprising means to generate push-pull erasing signals, a pair of amplifiers connected in push-pull, means to apply said erasing signals to said push-pull amplifier, means to apply the output of said push-pull amplifier to said magnetic transducer, and means to block one of said pair of amplifiers for a desired interval to thereby record a signal.

5. Apparatus for recording signals with a magnetic transducer on a moving magnetic medium comprising means to generate push-pull erasing signals, a pair of amplifier tubes each including an anode and a control grid, an output transformer having a primary and a secondary winding, means to respectively couple the anodes of said pair of amplifiers to the respective ends of said primary winding, means to operatively couple said magnetic transducer to said secondary winding, means to apply said push-pull erasing signals to the control grids of said pair of amplifiers, means to bias said pair of amplifiers to be nonconducting except in the presence of said erasing signals, and means to apply a signal to a desired one of said pair of amplifiers to maintain it nonconducting during a desired interval to thereby record a signal.

6. Apparatus for recording signals with a magnetic transducer on a moving magnetic medium comprising means to generate alternating current erasing signals, means to apply said alternating current erasing signals to said magnetic transducer, and means operative during desired intervals for preventing the application to said transducer by said means to apply of the portion of erasing signals having a given polarity whereby the remaining portion of said erasing signal is recorded as a desired signal.

7. Apparatus for recording signals with a magnetic transducer on a moving magnetic medium comprising means to generate alternating current erasing signals, means to apply said alternating current erasing signals to said magnetic transducer, means to prevent said means to apply from applying a portion of said erasing signal having one polarity to said transducer for desired intervals while applying the remaining portion of said erasing signal to said transducer to record signals having one significance, and means to prevent said means to apply from applying a portion of said erasing signals having the opposite polarity to said transducer for desired intervals while applying the remaining portion of said erasing signal to said transducer, thereby to record signals having another significance.

References Cited in the file of this patent

UNITED STATES PATENTS 1,886,616 Alverson ---------------- Nov. 8, 1932